(12) United States Patent
Ando et al.

(10) Patent No.: US 10,944,825 B2
(45) Date of Patent: Mar. 9, 2021

(54) INFORMATION SHARING SUPPORT SERVER, INFORMATION SHARING SUPPORT SYSTEM, AND INFORMATION SHARING SUPPORT METHOD

(71) Applicant: TAP AROUND INC., Saitama (JP)

(72) Inventors: Yuta Ando, Saitama (JP); Lawrence Yuhwan Lein, Saitama (JP)

(73) Assignee: Tap Around Inc., Saitama (JP)

( * ) Notice: Subject to any disclaimer, the term of this patent is extended or adjusted under 35 U.S.C. 154(b) by 119 days.

(21) Appl. No.: 15/771,111

(22) PCT Filed: Oct. 27, 2015

(86) PCT No.: PCT/JP2015/080220
§ 371 (c)(1),
(2) Date: Apr. 26, 2018

(87) PCT Pub. No.: WO2017/072850
PCT Pub. Date: May 4, 2017

(65) Prior Publication Data
US 2018/0375937 A1 Dec. 27, 2018

(51) Int. Cl.
*H04L 29/08* (2006.01)
*H04W 40/24* (2009.01)
(Continued)

(52) U.S. Cl.
CPC .......... *H04L 67/1097* (2013.01); *G06F 13/00* (2013.01); *H04L 51/20* (2013.01);
(Continued)

(58) Field of Classification Search
CPC ..... G06F 13/00; H04L 67/1097; H04L 67/18; H04L 51/32; H04L 51/20; H04L 61/6022;
(Continued)

(56) References Cited

U.S. PATENT DOCUMENTS

| 2007/0030824 A1 | 2/2007 | Ribaudo et al. |
| 2009/0201896 A1* | 8/2009 | Davis ........... H04W 84/18 370/338 |

(Continued)

FOREIGN PATENT DOCUMENTS

| EP | 1 265 151 A2 | 12/2002 |
| JP | 2010-177876 A | 8/2010 |

(Continued)

OTHER PUBLICATIONS

Extended European search report dated May 24, 2019 issued in corresponding EP patent application 15907214.9.

*Primary Examiner* — Abdulkader M Alriyashi
(74) *Attorney, Agent, or Firm* — Carrier, Blackman & Associates, P.C.; Joseph P. Carrier; Jeffrey T. Gedeon

(57) ABSTRACT

To support information sharing between terminals existing within a short distance from each other while a burden on a server administrator is prevented from increasing or decreased. An information sharing support server includes a server data transmission and reception control unit which recognizes identifiers of sending terminals associated with identifiers of originating terminals (STEP 446, STEP 466), recognizes identifiers of terminals associated with the relevant identifiers of the sending terminals (STEP 448, STEP 450, STEP 468), and transmits data to the relevant terminals (STEP 452, STEP 470).

8 Claims, 7 Drawing Sheets

(51) Int. Cl.
*G06F 13/00* (2006.01)
*H04L 12/58* (2006.01)
*H04W 4/029* (2018.01)
*H04L 29/12* (2006.01)
*H04W 4/08* (2009.01)
*H04W 4/80* (2018.01)

(52) U.S. Cl.
CPC .............. *H04L 51/32* (2013.01); *H04L 67/18* (2013.01); *H04W 4/029* (2018.02); *H04W 40/244* (2013.01); *H04L 61/6022* (2013.01); *H04W 4/08* (2013.01); *H04W 4/80* (2018.02)

(58) Field of Classification Search
CPC ..... H04W 40/244; H04W 4/029; H04W 4/08; H04W 4/80
See application file for complete search history.

(56) References Cited

U.S. PATENT DOCUMENTS

| | | | |
|---|---|---|---|
| 2009/0204354 A1* | 8/2009 | Davis | H04W 84/18 702/89 |
| 2012/0252516 A1* | 10/2012 | Miyabayashi | H04W 64/00 455/515 |
| 2014/0269657 A1* | 9/2014 | Kim | H04W 8/005 370/338 |
| 2015/0033292 A1* | 1/2015 | Nguyen | H04L 63/08 726/4 |
| 2015/0111604 A1* | 4/2015 | Kang | H04W 4/023 455/456.3 |

FOREIGN PATENT DOCUMENTS

| | | |
|---|---|---|
| JP | 2010-268144 A | 11/2010 |
| JP | 2012-215938 A | 11/2012 |
| JP | 2014-127772 A | 7/2014 |
| WO | 2012/159039 A1 | 11/2012 |
| WO | 2013/073474 A1 | 5/2013 |
| WO | 2015/012152 A1 | 1/2015 |

* cited by examiner

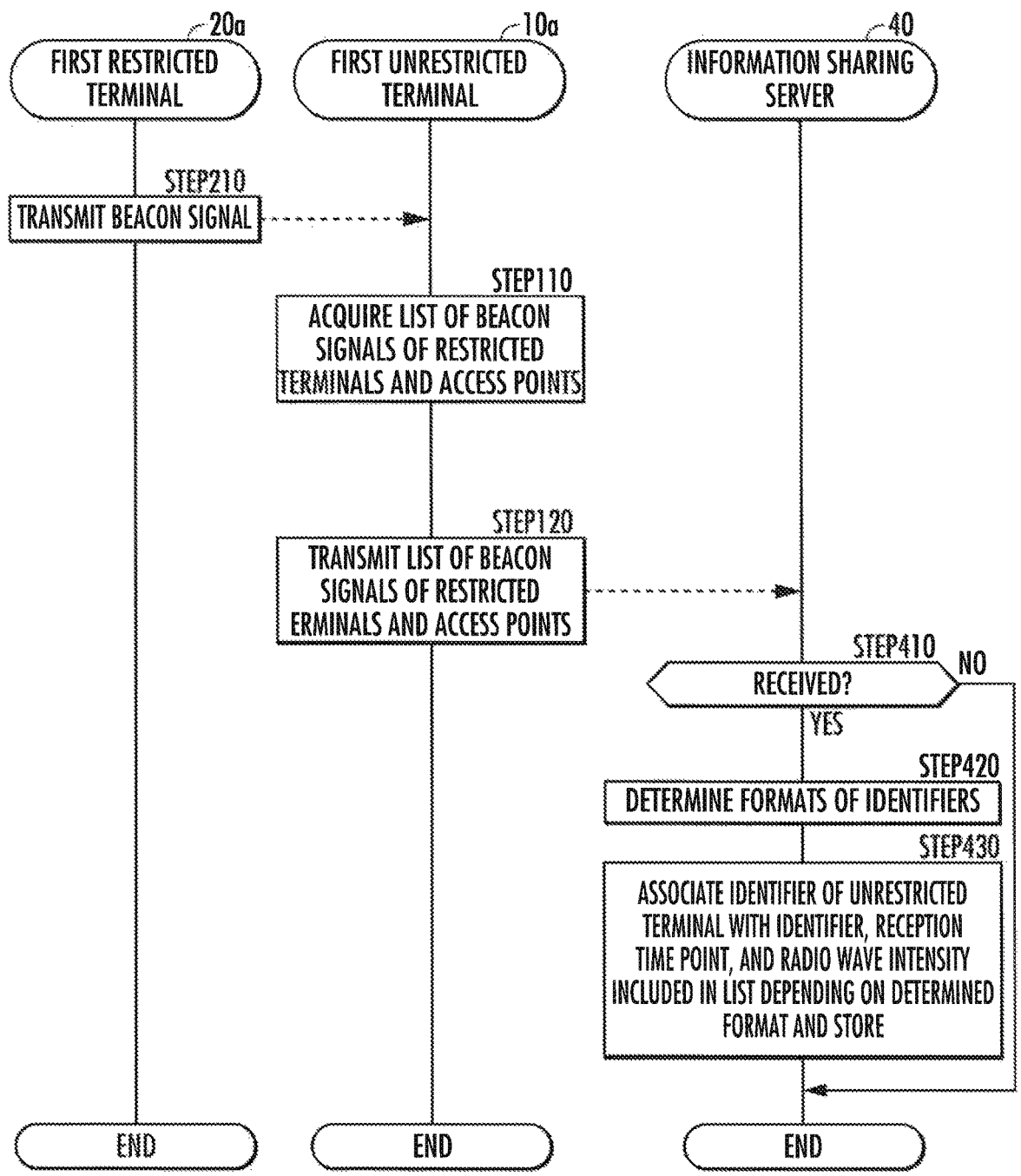

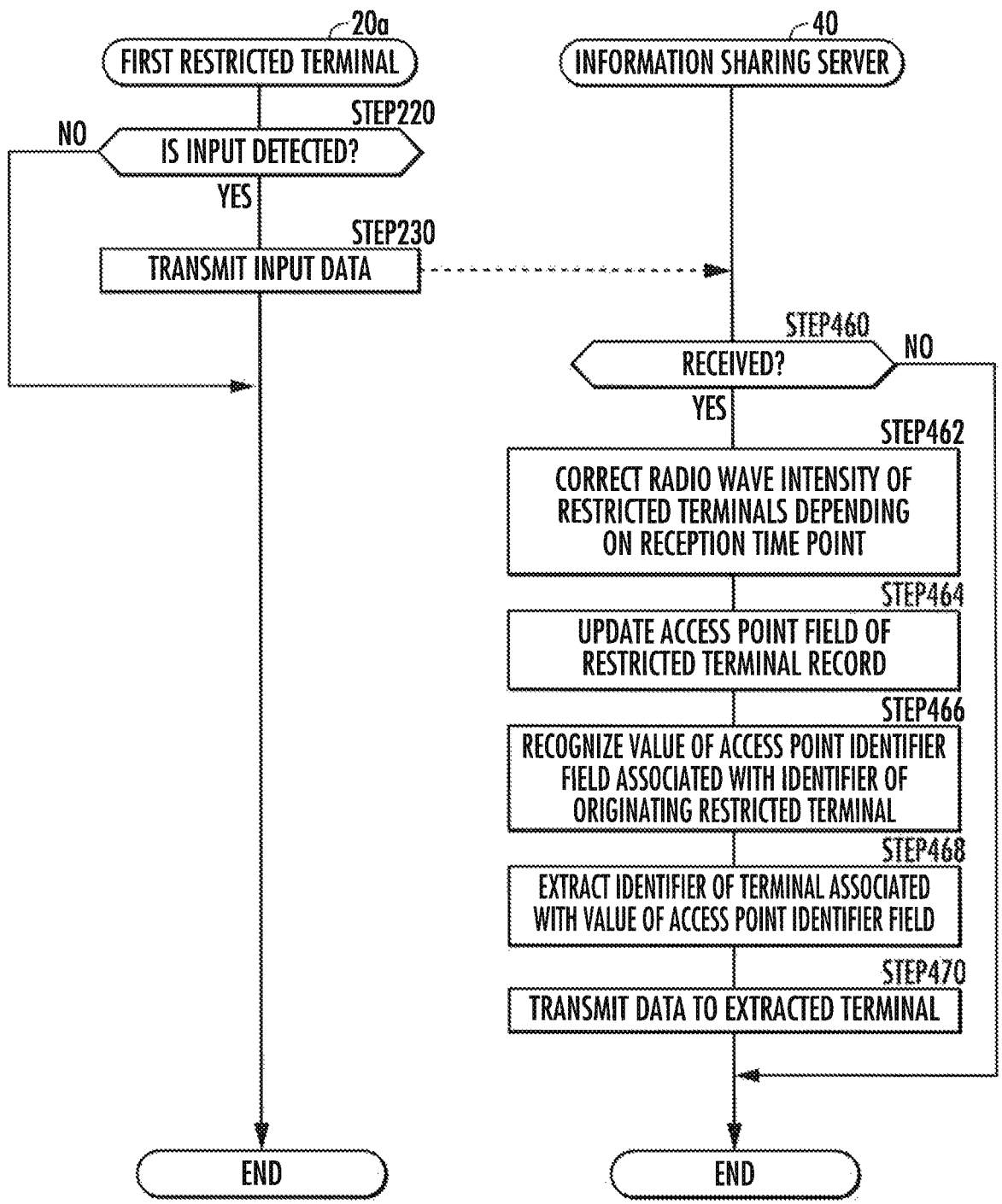

FIG.3A

| Terminal Identifier (51) | Access Point (52) | | | Restricted Terminal (53) | | |
|---|---|---|---|---|---|---|
| | Identifier (521) | Reception Time Point (522) | Radio Wave Intensity (dBm) (523) | Identifier (531) | Reception Time Point (532) | Radio Wave Intensity (dBm) (533) |
| 10a | 30a | YY/MM/DD 10:00:00 | -70 | 20a | YY/MM/DD 10:00:00 | -60 |
| | 30b | YY/MM/DD 10:00:00 | -50 | | | |
| | 30a | YY/MM/DD 10:01:00 | -80 | | | |
| | 30b | YY/MM/DD 10:01:00 | -60 | | | |
| 10b | 30a | YY/MM/DD 10:00:00 | -40 | 20a | YY/MM/DD 10:00:00 | -80 |
| | 30b | YY/MM/DD 10:00:00 | -50 | 20b | YY/MM/DD 10:00:00 | -90 |
| | 30c | YY/MM/DD 10:00:00 | -70 | | | |
| | 30d | YY/MM/DD 10:00:00 | -70 | 20a | YY/MM/DD 10:01:00 | -60 |
| | 30a | YY/MM/DD 10:01:00 | -50 | | | |
| | 30b | YY/MM/DD 10:01:00 | -80 | | | |
| | 30c | YY/MM/DD 10:01:00 | -60 | | | |
| | 30d | YY/MM/DD 10:01:00 | -40 | | | |
| 10c | 30a | YY/MM/DD 10:00:00 | -90 | 20b | YY/MM/DD 10:00:00 | -40 |
| | 30b | YY/MM/DD 10:00:00 | -40 | 20a | YY/MM/DD 10:01:00 | -80 |
| | 30c | YY/MM/DD 10:01:00 | -50 | 20b | YY/MM/DD 10:01:00 | -90 |
| | 30d | YY/MM/DD 10:01:00 | -70 | 20a | YY/MM/DD 10:02:00 | -60 |
| | 30a | YY/MM/DD 10:02:00 | -70 | 20b | YY/MM/DD 10:02:00 | -55 |
| | 30b | YY/MM/DD 10:02:00 | -50 | | | |
| 10d | 30c | YY/MM/DD 10:02:00 | -40 | | | |
| | 30d | YY/MM/DD 10:02:00 | -90 | | | |
| 20a | | | | | | |
| 20b | | | | | | |

FIG.3B

| TERMINAL IDENTIFIER | ACCESS POINT | | | RESTRICTED TERMINAL | | |
|---|---|---|---|---|---|---|
| | IDENTIFIER | RECEPTION TIME POINT | RADIO WAVE INTENSITY (dBm) | IDENTIFIER | RECEPTION TIME POINT | RADIO WAVE INTENSITY (dBm) |
| 10a | 30a | YY/MM/DD 10:00:00 | -70 | 20a | YY/MM/DD 10:00:00 | -70 |
| | 30b | YY/MM/DD 10:00:00 | -50 | | | |
| | 30a | YY/MM/DD 10:01:00 | -80 | | | |
| | 30b | YY/MM/DD 10:01:00 | -60 | | | |
| 10b | 30b | YY/MM/DD 10:00:00 | -40 | 20a | YY/MM/DD 10:00:00 | -90 |
| | 30c | YY/MM/DD 10:00:00 | -50 | 20b | YY/MM/DD 10:00:00 | -100 |
| | 30d | YY/MM/DD 10:00:00 | -70 | | | |
| | 30b | YY/MM/DD 10:01:00 | -70 | | | |
| | 30c | YY/MM/DD 10:01:00 | -50 | | | |
| | 30d | YY/MM/DD 10:01:00 | -80 | | | |
| 10c | 30a | YY/MM/DD 10:02:00 | -60 | 20a | YY/MM/DD 10:00:00 | -65 |
| | 30b | YY/MM/DD 10:02:00 | -40 | | | |
| | 30c | YY/MM/DD 10:02:00 | -90 | | | |
| | 30b | YY/MM/DD 10:01:00 | -40 | | | |
| | 30c | YY/MM/DD 10:01:00 | -50 | | | |
| | 30d | YY/MM/DD 10:01:00 | -70 | | | |
| 10d | 30a | YY/MM/DD 10:02:00 | -70 | 20b | YY/MM/DD 10:00:00 | -50 |
| | 30b | YY/MM/DD 10:02:00 | -50 | 20a | YY/MM/DD 10:01:00 | -85 |
| | 30c | YY/MM/DD 10:02:00 | -40 | 20b | YY/MM/DD 10:01:00 | -95 |
| | 30d | YY/MM/DD 10:02:00 | -90 | | | |
| 20a | 30a | YY/MM/DD 10:02:00 | -70 | 20a | YY/MM/DD 10:02:00 | -60 |
| | 30b | YY/MM/DD 10:02:00 | -50 | 20b | YY/MM/DD 10:02:00 | -55 |
| 20b | 30c | YY/MM/DD 10:00:00 | -40 | | | |
| | 30d | YY/MM/DD 10:00:00 | -90 | | | |

INFORMATION SHARING SUPPORT SERVER, INFORMATION SHARING SUPPORT SYSTEM, AND INFORMATION SHARING SUPPORT METHOD

TECHNICAL FIELD

The present invention relates to a server, a system and a method which support information sharing between plural terminals over a short distance.

BACKGROUND ART

In the past, a system has been known which promotes information sharing between plural terminals existing within a short distance from each other.

For example, a server has been known which includes a receiving part receiving moving image data taken by a camera function of a first mobile terminal and positional information on the first mobile terminal, an area determining part determining an area including a position which is indicated by the positional information on the basis of the received positional information on the first mobile terminal, an e-mail notifying part transmitting an e-mail including a URL (Uniform Resource Locator) of the moving image data to one or more second mobile terminals which exist in the determined area, and a moving image distributing part distributing, when receiving a request to distribute the moving image which includes the relevant URL from the second mobile terminal, the moving image data to the second mobile terminal (e.g., see Patent Literature 1).

Patent Literature 1 has proposed that in the relevant server, a BSSID (Basic Service Set Identifier) of a base station during communicating with the first mobile terminal is used as the positional information indicating the position of the first mobile terminal to determine as the area, a region including the second mobile terminal communicating with the relevant base station.

According to the server having this configuration, between the first mobile terminal and the second mobile terminal which use the same base station, the moving image data taken by the first mobile terminal can be distributed to the second mobile terminal. Therefore, information sharing can be made between the terminals in the region (area) communicable with the same base station.

CITATION LIST

Patent Literature

Patent Literature 1: Japanese Patent Laid-Open Application No. 2010-177876

SUMMARY OF INVENTION

Technical Problem

However, if telecom companies to which users of the mobile terminals subscribe are different, the base stations which the relevant mobile terminals use for communication are often different. Identification information for the moving image data may possibly not be distributed to a user of a mobile terminal who subscribes to a telecom company different from a telecom company to which a user of the first mobile terminal subscribes, because even if the former user is near the user of the first mobile terminal, he/she may be determined to use a base station different from that used by the first mobile terminal. In addition, information of the base stations of the telecom companies need to be registered on the server in advance in order to avoid such a problem, but, in this case, an administrator of the server is largely burdened in such case.

For this reason, an object of the present invention is to provide a server, a system, and a method capable of supporting information sharing between the terminals existing within a short distance from each other while preventing or decreasing a burden increase on a server administrator.

Solution to Problem

An information sharing support server according to the present invention includes a server storage configured to store information, a server communication unit configured to perform communication, an identifier storing control unit configured to, when receiving from a terminal, an identifier of the terminal and an identifier of a sending terminal received by the terminal, via the server communication unit, the terminal wirelessly having received the identifier of the sending terminal sent by the sending terminal which sends its identifier, associate the identifier of the terminal and the identifier of the sending terminal with each other to store in the server storage, and a server data transmission and reception control unit configured to, when receiving, from an originating terminal requiring data sharing, an identifier of the relevant originating terminal and the data via the server communication unit, refer to the server storage to recognize the identifier of the sending terminal associated with the identifier of the originating terminal and recognize the identifier of the terminal associated with the relevant recognized identifier of the sending terminal, and transmit the data to a terminal identified by the relevant recognized identifier via the server communication unit.

Here, the sending terminal sends its identifier and the terminal wirelessly receives the relevant identifier of the sending terminal, which means that the relevant terminal existed in the vicinity of the sending terminal to some extent.

In other words, it can be estimated that plural terminals respectively wirelessly receiving the relevant identifier of the sending terminal from the same sending terminal exist within a short distance from each other to such an extent that they can or could receive the relevant identifier of the sending terminal wirelessly from the relevant sending terminal.

According to the information sharing support server of the invention configured in consideration of this point, the identifier of the terminal and the identifier of the sending terminal received by the relevant terminal are associated with each other and stored in the server storage by the identifier storing control unit. Here, an identifier of one terminal is associated with the identifier of the sending terminal, which is further associated with an identifier another terminal has, and thus, that another terminal wirelessly receives the relevant identifier of the sending terminal from the sending terminal the same as the sending terminal from which one terminal receives the identifier, and therefore, is estimated to exist in the vicinity of the relevant one terminal.

Then, when receiving the identifier of the originating terminal and the data from the originating terminal, the server data transmission and reception control unit refers to the server storage to recognize the Identifier of the terminal which is associated with the identifier of the sending terminal associated with the identifier of the originating terminal, that is, to recognize the identifier of the terminal estimated to exist in the vicinity of the originating terminal, and transmits the data to a terminal identified by the relevant identifier (hereinafter, referred to as "destination terminal").

As a result of this, since the data is transmitted to the destination terminal estimated to exist in the vicinity of the originating terminal, information sharing is supported between the terminals existing within a short distance from each other.

In supporting the above information sharing, information of a base station and the like does not need to be registered in an information sharing supporting server, allowing the burden increase on the server administrator to be prevented or to be decreased.

As described above, according to the Information sharing support server of the relevant configuration, it is possible to support the information sharing between the terminals existing within a short distance from each other while the burden increase on the server administrator is prevented or decreased.

In the information sharing support server according to the invention, it is preferable that the identifier storing control unit repeatedly receives from the terminal the identifier of the terminal and the identifier of the sending terminal received by the relevant terminal via the server communication unit, and associates the identifier of the terminal, the identifier of the sending terminal, and a reception time point of the relevant identifier of the sending terminal to store them in the server storage, and the server data transmission and reception control unit is configured to, when receiving, from the originating terminal, the identifier of the relevant originating terminal and the data via the server communication unit, refer to the server storage to recognize the identifier of the sending terminal of which the reception time point is within a predetermined first specific time period, among the identifiers of the sending terminals associated with the identifier of the relevant originating terminal and recognize the identifier of the terminal of which the reception time point is within the first specific time period, among the identifiers of the terminals associated with the relevant recognized identifier of the sending terminal, and transmit the data to a terminal identified by the relevant recognized identifier via the server communication unit.

The "reception time point of the identifier of the sending terminal" in the invention includes not only a time point when each terminal receives by each terminal the relevant identifier of the sending terminal from the sending terminal, but also a time point when relaying the identifier of the terminal and identifier of the sending terminal which a communication repeater measures by its clock function, and a time point the information sharing support server receives the identifier of the terminal and identifier of the sending terminal from each terminal which the information sharing support server measures by its clock function. The "time point when receiving" the information such as the identifier includes not only a time point when the information receiving is completed, but also a time point when the information receiving is considered to be completed. The "time point when relaying" the information such as the identifier includes not only a time point when transmitting of the identifier of the sending terminal transmitting is completed, but also a time point when transmitting of the identifier of the sending terminal transmitting is considered to be completed.

According to the information sharing support server of the relevant configuration, the identifier of the terminal and the identifier of the sending terminal are repeatedly received by the identifier storing control unit, and the reception time point of the identifier of the sending terminal is associated with the identifier of the terminal and the identifier of the sending terminal, and stored in the server storage.

The server data transmission and reception control unit recognizes the identifier of the sending terminal of which the reception time point is within the first specific time period, among the identifiers of the sending terminals associated with the identifier of the originating terminal.

The server data transmission and reception control unit recognizes the identifier of the terminal of which the reception time point of the identifier of the sending terminal is within the first specific time period, among the identifiers of the terminals associated with the identifier of this sending terminal.

The plural terminals receiving the identifier of the same sending terminal within the first specific time period means that the relevant plural terminals respectively existed in relatively recent times in the vicinity of the relevant sending terminal in the first specific time period.

Therefore, according to the information sharing support server of the relevant configuration, it is possible to support the information sharing between the terminals having existed within a short distance from each other while the burden increase on the server administrator is prevented or decreased.

In the information sharing support server of the relevant configuration, it is preferable that the server data transmission and reception control unit Is configured to, when receiving from the originating terminal the identifier of the relevant originating terminal and the data via the server communication unit, refer to the server storage to recognize, among the identifiers of the sending terminals associated with the identifier of the originating terminal, the identifier of the sending terminal of which the reception time point of the relevant identifier of the sending terminal is within the first specific time period, and recognize, of the identifiers of the terminals associated with the relevant identifier of the sending terminal, the identifier of the terminal of which the reception time point of the relevant identifier of the sending terminal is within the first specific time period, and of which a first number of identifiers is equal to or more than a first threshold, the first number of identifiers being a number of the identifiers of the sending terminals each of which the reception time point of the relevant identifier of the sending terminal is within the first specific time period or a number of times receiving the identifier of the sending terminal within the first specific time period, and transmit the data to a terminal identified by the relevant recognized identifier via the server communication unit.

According to the information sharing support server of the relevant configuration, among the identifiers of the terminals associated with the relevant identifier of the sending terminal by the server data transmission and reception control unit, the identifier of the terminal is recognized of which the reception time point of the relevant identifier of the sending terminal is within the first specific time period, and of which the first number of identifiers is equal to or more than the first threshold, the first number of identifiers being the number of the relevant identifiers of the sending terminals or the number of times the relevant identifier of the sending terminal is received, that is, the identifier of the terminal for which the received identifiers of the sending terminal are common to the destination terminal to some extent, is recognized.

The terminals for which the received identifiers of the sending terminals are common to some extent are estimated to have existed in an area where the identifier of the sending terminal can be received from the plural sending terminals or have existed within a short distance from each other for a certain time period.

In other words, according to the information sharing support server of the relevant configuration, the data is transmitted to a terminal identified by the recognized identifier of the terminal, and the information sharing is supported between the terminals which are estimated to have existed in the area where the identifier of the sending terminal can be received from the plural sending terminals or have existed within a short distance from each other for a certain time period.

In the information sharing support server of the relevant configuration, it is preferable that the first threshold is a value obtained by multiplying a second number of identifiers by a predetermined rate, the second number of identifiers being a number of the identifiers of the sending terminals each of which the reception time point of the relevant identifier of the sending terminal is within the first specific time period or a number of times receiving the identifier of the sending terminal within the first specific time period, among the identifiers of the sending terminals associated with the identifier of the originating terminal.

According to the Information sharing support server of the relevant configuration, among the identifiers of the terminals associated with the relevant identifier of the sending terminal by the server data transmission and reception control unit, the identifier of the terminal is recognized of which the reception time point of the relevant identifier of the sending terminal is within the first specific time period, and also of which the first number of identifiers which is the number of the relevant identifiers of the sending terminals is equal to or more than a value obtained by multiplying the second number of identifiers by a predetermined rate, that is, the identifier of the terminal for which the received identifiers of the sending terminals are common to the destination terminal in a predetermined ratio or more, is recognized.

The terminal for which the received identifiers of the sending terminals are common in a predetermined ratio or more are estimated to have existed in an area where the identifier of the sending terminal can be received from the plural sending terminals or have existed within a short distance from each other for a certain time period. Further, since the first threshold is calculated by multiplying the second number of identifiers by a predetermined rate, determination is made based on a common criteria whether many or small number of sending terminals exist around the originating terminal.

In other words, according to the information sharing support server of the relevant configuration, the data is transmitted to a terminal identified by the recognized identifier of the terminal, and the information sharing is supported between the terminals which are estimated to have existed within a short distance from each other for a certain time period.

In the information sharing support server of the relevant configuration, it is preferable that the first threshold is a predetermined value larger than one.

According to the information sharing support server of the relevant configuration, among the identifiers of the terminals associated with the relevant identifier of the sending terminal by the server data transmission and reception control unit, the identifier of the terminal is recognized of which the reception time point of the relevant identifier of the sending terminal is within the first specific time period, and also of which the first number of identifiers is the value larger than one, that is, the identifier of the terminal for which the received identifiers of the sending terminals are common to the destination terminal by a plural number of identifiers or the identifier of the terminal which has received the identifier of the sending terminal from the same sending terminal by a plural number of times, is recognized.

The terminal for which the received identifiers of the sending terminals are common by a plural number of identifiers or the terminal which has received the identifier of the sending terminal from the same sending terminal by a plural number of times temporarily existed at a position capable of receiving the identifier from the same sending terminal or had a chance to receive the identifier from the same sending terminal at plural time points, and thus, are estimated to have existed within a short distance from each other.

In other words, according to the information sharing support server of the relevant configuration, the data is transmitted to a terminal identified by the recognized identifier of the terminal, the information sharing is supported between the terminals which temporarily existed at a position capable of receiving the identifier from the same sending terminal or had a chance to receive the identifier from the same sending terminal at plural time points.

In the information sharing support server of the relevant configuration, it is preferable that the server data transmission and reception control unit, in a case where the first specific time period prior to a current time point is divided into a plurality of second specific time periods, recognizes for each second specific time period, whether or not a third number of identifiers is equal to or more than a second threshold, the third number of identifiers being a number of the identifiers of the sending terminal associated with both of the identifier of the originating terminal and the identifier of a target terminal for the relevant second specific time period or being a number of times the sending terminal is received by both of the originating terminal and the target terminal for the relevant second specific time period, recognizes the identifier of the target terminal for which a ratio of the second specific time period for which the third number of identifiers is equal to or more than the second threshold to the entire first specific time period, is equal to or more than a predetermined ratio, and transmits the data to a terminal identified by the relevant recognized identifier via the server communication unit.

According to the information sharing support server of the relevant configuration, for each of a second specific time period, the data is transmitted to a terminal for which a ratio of the second specific time period in which the third number of Identifiers being equal to or more than the second threshold to the entire first specific time period, is equal to or more than the second threshold, the third number of identifiers being the number of the relevant identifiers of the sending terminals for each second specific time period for the relevant second specific time period or the number of times the relevant identifier of the sending terminal is received for the relevant second specific time period.

The terminal meeting this condition is estimated to have existed in the vicinity of the originating terminal to such an extent that it could receive the identifier from the same sending terminal at the plural past time points.

In other words, according to the information sharing support server of the relevant configuration, the data is transmitted to a terminal identified by the recognized identifier of the terminal, and the information sharing is supported between the terminals existing within a short distance from each other to such an extent that they could receive the identifier from the same sending terminal at the plural past time points.

In the information sharing support server according to the invention, it is preferable that the identifier storing control unit receives from the terminal the identifier of the terminal, the identifier of the sending terminal received by the relevant terminal, and a radio wave intensity of signals containing the relevant identifier of the sending terminal when the relevant terminal receives the identifier of the sending terminal via the server communication unit, and associates the identifier of the terminal, the identifier of the sending terminal, and the relevant radio wave intensity with each other to store them in the server storage, and the server data transmission and reception control unit is configured to, when receiving, from the originating terminal requiring data sharing, the identifier of the relevant originating terminal and the data via the server communication unit, refer to the server storage to recognize the identifier of the sending terminal associated with the identifier of the originating terminal, and recognize the identifier of the terminal of which the radio wave intensity meets a predetermined condition, among the identifiers of the terminals associated with the relevant recognized identifier of the sending terminal, and transmit the data to a terminal identified by the relevant recognized identifier via the server communication unit.

According to the information sharing support server of the relevant configuration, the data is transmitted to the terminal like this, allowing the data to be transmitted to the terminal estimated to exist within a specific range of an area around the relevant sending terminal.

As a result of this, the information sharing is appropriately supported for the terminals existing within a specific range of an area around the relevant sending terminal.

In the information sharing support server of the relevant configuration, it is preferable that the identifier of the sending terminal is a first sending terminal identifier that is the identifier of the sending terminal of a predetermined first format or a second sending terminal identifier that is the identifier of the sending terminal of a predetermined second format which is different from the first format, and the server data transmission and reception control unit is configured to, when receiving from the originating terminal the identifier of the relevant originating terminal and the data via the server communication unit, refer to the server storage to recognize the first sending terminal identifier associated with the identifier of the originating terminal, recognize the identifier of the terminal associated with the relevant recognized first sending terminal identifier, recognize the second sending terminal identifier associated with the relevant recognized identifier of the terminal, and transmit the data to a sending terminal identified by the relevant second sending terminal identifier via the server communication unit.

According to the information sharing support server of the relevant configuration, the sending terminal identified by the second sending terminal identifier associated with destination terminal exists in the vicinity of the relevant destination terminal, and thus, also exists in the vicinity of the originating terminal. The data is transmitted to the sending terminal identified by the second sending terminal identifier like this, such that even the sending terminal which does not or cannot transmit its identifier and the identifier of a surrounding sending terminal to the information sharing support server can receive the data transmitted by the originating terminal.

In the information sharing support server of the relevant configuration, it is preferable that the identifier of the sending terminal is a first sending terminal identifier that is the identifier of the sending terminal of a predetermined first format or a second sending terminal identifier that is the identifier of the sending terminal of a predetermined second format which is different from the first format, and the server data transmission and reception control unit is configured to, when receiving from the sending terminal identified by the second sending terminal identifier the relevant second sending terminal identifier and the data via the server communication unit, refer to the server storage to recognize the identifier of the terminal associated with the second sending terminal identifier, recognize the first sending terminal identifier associated with the relevant recognized terminal, recognize the identifier of the terminal associated with the relevant recognized first sending terminal identifier, and transmit the data to a terminal identified by the relevant recognized identifier via the server communication unit.

According to the information sharing support server of the relevant configuration, the data transmitted from the sending terminal which does not or cannot transmit its identifier and the identifier of a surrounding sending terminal to the information sharing support server is transmitted to a terminal estimated to exist around the relevant sending terminal.

As a result of this, the information sharing is appropriately supported between the terminals existing within a short distance from each other.

An information sharing support system according to the invention is a system including plural terminals, and an information sharing support server, wherein the information sharing support server comprising a server storage configured to store information, a server communication unit configured to perform communication, an identifier storing control unit configured to, when receiving from a terminal, an identifier of the terminal and an identifier of a sending terminal received by the terminal, via the server communication unit, the terminal wirelessly having received the identifier of the sending terminal sent by the sending terminal which sends its identifier, associate the identifier of the terminal and the identifier of the sending terminal with each other to store them in the server storage, and a server data transmission and reception control unit configured to, when receiving from an originating terminal requiring data sharing, an identifier of the relevant originating terminal and the data via the server communication unit, refer to the server storage to recognize the identifier of the sending terminal associated with the identifier of the originating terminal, recognize the identifier of the terminal associated with the relevant recognized identifier of the sending terminal, and transmit the data to a destination terminal that is a terminal identified by the relevant recognized identifier via the server communication unit, the originating terminal including an originating terminal input unit configured to detect an input operation by a user, an originating terminal communication unit configured to perform communication, and an originating terminal data transmission control unit configured to transmit the data to the information sharing support server via the originating terminal communication unit depending on the input operation by the user to the originating terminal input unit, the destination terminal including a destination terminal output unit configured to output information, a destination terminal communication unit configured to perform communication, and a destination terminal data reception control unit configured to output to the destination terminal output unit data which is received from the information sharing support server via the destination terminal communication unit.

According to the information sharing support system of the invention, an effect similar to the above-described information sharing support server according to the invention can be obtained.

An information sharing support method according to the invention is a method carried out by an information sharing support server which including a server storage configured to store information and a server communication unit configured to perform communication, the method including an identifier receiving step of receiving from a terminal, an identifier of the terminal and an identifier of a sending terminal received by the terminal, via the server communication unit, the terminal wirelessly having received the identifier of the sending terminal sent by the sending terminal which sends its identifier, an identifier storing controlling step of associating the identifier of the terminal and the identifier of the sending terminal to each other to store them in the server storage, a data receiving step of receiving from an originating terminal requiring data sharing, an identifier of the relevant originating terminal and the data via the server communication unit, a sending terminal identifier recognizing step of referring to the server storage to recognize the identifier of the sending terminal associated with the identifier of the originating terminal, a destination terminal identifier recognizing step of recognizing the identifier of the terminal associated with the relevant recognized identifier of the sending terminal, and a data transmitting step of transmitting the data to a terminal identified by the relevant recognized identifier via the server communication unit.

The information sharing support method according to the invention may be applied to a server and implemented to obtain an effect similar to the above-described information sharing support server according to the invention.

BRIEF DESCRIPTION OF DRAWINGS

FIG. 2A, FIG. 2B, and FIG. 2C are flowcharts in which FIG. 2A illustrates an identifier storing control process and FIG. 2B illustrates an unrestricted terminal data transmission and reception control process and FIG. 2C Illustrates a restricted terminal data transmission and reception control process.

FIG. 3A and FIG. 3B are structure diagrams in which FIG. 3A illustrates a table stored in a server storage and FIG. 3B illustrates a table stored in the server storage, showing a structure of a table in a case where a radio wave intensity is corrected and an access point field for a restricted terminal is set.

FIG. 4A to FIG. 4C are graphs and FIG. 4D to FIG. 4E are diagrams in which FIG. 4A is a graph in which an ordinate represents the number of common access points and an abscissa represents identifiers of the terminals, FIG. 4B is a graph in which an ordinate represents the number of identifiers of access points associated with identifiers of both an originating terminal and a target terminal, and an abscissa represents time points, FIG. 4C is a graph in which an ordinate represents the number of identifiers of access points associated with identifiers of both an originating terminal and a target terminal, and an abscissa represents time points. FIG. 4D is a diagram showing a moving route of the originating terminal and target terminal corresponding to the graph in FIG. 4B, and FIG. 4E is a diagram showing a moving route of the originating terminal and target terminal corresponding to the graph in FIG. 4C.

DESCRIPTION OF EMBODIMENTS

A description is given of a embodiment of the present invention with reference to FIG. 1 to FIG. 4E.

Figure 1:
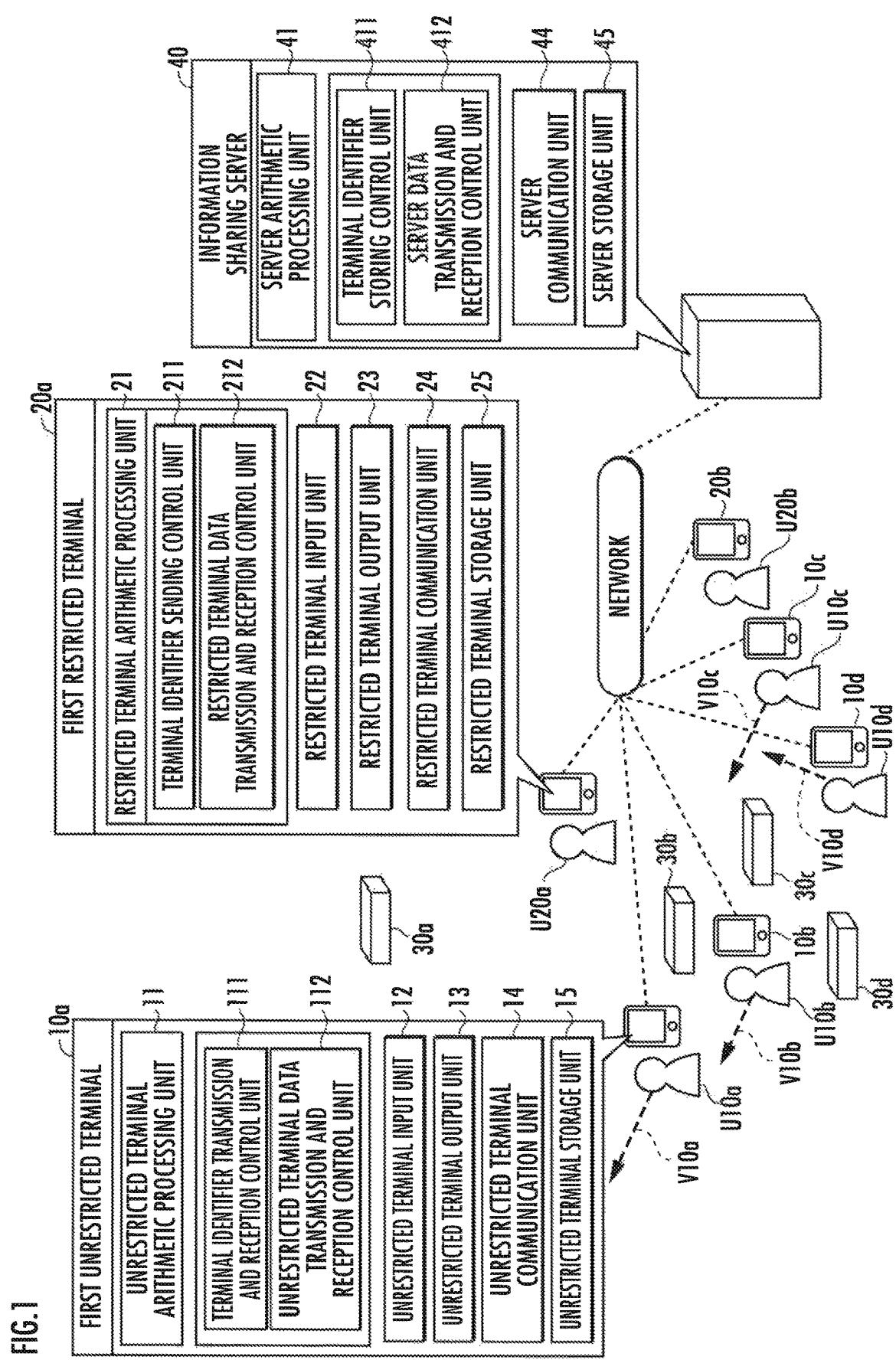
FIG. 1 is a general configuration diagram of an information sharing support system according to the present invention.

An information sharing support system according to the embodiment of the invention comprises unrestricted terminals (a first unrestricted terminal 10a to a fourth unrestricted terminal 10d in FIG. 1), restricted terminals (a first restricted terminal 20a to a second restricted terminal 20b in FIG. 1), and an information sharing support server 40 which are connected via a wide area network such as the Internet, as shown in FIG. 1.

There are access points (a first access point 30a to a fourth access point 30d in FIG. 1) around the unrestricted terminals and the restricted terminals.

Note that each of the unrestricted terminal and the restricted terminal corresponds to an "originating terminal" in information sharing support server, information sharing support system, and information sharing support method according to the invention.

Each of the unrestricted terminal and the restricted terminal corresponds to a "destination terminal" in the information sharing support system according to the invention.

(Configuration of Unrestricted Terminal)

A configuration of the unrestricted terminal is described using the first unrestricted terminal 10a in FIG. 1 as an example. Other unrestricted terminals 10b to 10d also have the same configuration as the first unrestricted terminal 10a.

The first unrestricted terminal 10a includes an information terminal such as a tablet type terminal or a smartphone whose size, shape and weight are designed so as to be portable by a user.

The first unrestricted terminal 10a comprises an unrestricted terminal arithmetic processing unit 11, an unrestricted terminal input unit 12, an unrestricted terminal output unit 13, an unrestricted terminal communication unit 14, and an unrestricted terminal storage unit 15.

The unrestricted terminal input unit 12 corresponds to an "originating terminal input unit" in the information sharing support system according to the present invention. The unrestricted terminal output unit 13 corresponds to a "destination terminal output unit" in the information sharing support system according to the invention. The unrestricted terminal communication unit 14 corresponds to "originating terminal communication unit" and "destination terminal communication unit" in the information sharing support system according to the invention.

The unrestricted terminal arithmetic processing unit 11 includes an arithmetic processing device such as a CPU.

The first unrestricted terminal 10a has an unrestricted OS (Operating System) installed therein. The relevant unrestricted OS is read and executed by the unrestricted terminal arithmetic processing unit 11 such that the unrestricted terminal arithmetic processing unit 11 executing other programs (application software) is provided with an interface for utilizing each hardware resource in the first unrestricted terminal 10a (unrestricted terminal arithmetic processing unit 11, unrestricted terminal input unit 12, unrestricted terminal output unit 13, unrestricted terminal communication unit 14, and unrestricted terminal storage unit 15).

The unrestricted terminal arithmetic processing unit 11 executing the unrestricted OS functions to make the unrestricted terminal arithmetic processing unit 11 executing other programs to recognize identifiers of surrounding terminals contained in beacon signals received from the terminals.

The phrase that the unrestricted terminal arithmetic processing unit 11 executing the unrestricted OS makes the unrestricted terminal arithmetic processing unit 11 executing other programs "recognize" information externally obtained means that any arithmetic process is performed for making the relevant unrestricted terminal arithmetic processing unit 11 operating in accordance with the programs to utilize the following information, such as providing the information externally obtained as it is to the relevant unrestricted terminal arithmetic processing unit 11 executing other programs, the relevant information derived by that the unrestricted terminal arithmetic processing unit 11 executing the unrestricted OS executes a predetermined arithmetic process (such as calculation process and search process) on basic information externally obtained (e.g., signals received from other devices), and reading out the relevant information from an internal storage device or an external storage device by the unrestricted terminal arithmetic processing unit 11 executing the unrestricted OS in accordance with the relevant basic information, and then to provide the information.

The unrestricted terminal arithmetic processing unit 11 reads and executes an information sharing support client program installed therein in advance to function as terminal identifier transmission and reception control unit 111 and unrestricted terminal data transmission and reception control unit 112 described later which perform the arithmetic process.

The unrestricted terminal data transmission and reception control unit 112 corresponds to an "originating terminal data transmission control unit" and "originating terminal data reception control unit" in the information sharing support system according to the invention.

The unrestricted terminal input unit 12 includes a position input device such as a touch pad and the unrestricted terminal output unit 13 includes a display device such as liquid crystal panel, and both units are combined to configure the touch panel. In other words, the touch panel functions as an input interface and an output interface. On the touch panel a function image depending on the function of the program installed in the unrestricted terminal (application software), is displayed.

The unrestricted terminal input unit 12 may include, as an alternative or in addition to the touch panel, a detection device for detecting an aspect of a non-contact user input operation (speech content or gesture) such as a voice input device (microphone) or an image capturing device. The unrestricted terminal output unit 13 may include, as an alternative or in addition to the touch panel, an audio output device (speaker). In a case where the unrestricted terminal input unit 12 may recognize a non-contact user gesture (motion of facial expression, motion of a part of a body such as a fingertip or arm) by means of the image capturing device and the like, an aspect of the gesture may be detected as an input operation by the unrestricted terminal arithmetic processing unit 11 executing the unrestricted OS.

The unrestricted terminal arithmetic processing unit 11 executing the unrestricted OS serves as a user interface manager (UIM) to adjust content displayed on a touch panel (unrestricted terminal input unit 12 and unrestricted terminal output unit 13) and the like depending on an aspect of a touch gesture on the touch panel by the user. The touch gesture includes a tap (single tap, double tap, and long tap), a flick (up flick, down flick, left flick, and right flick), a swipe, a pinch (pinch in and pinch out), a multi-touch or the like.

The unrestricted terminal communication unit 14 is configured to mutually communicate with an external terminal including the information sharing support server 40 via the wide area network connected with a base station not shown in compliance with a communication standard suitable for long distance radio communication such as 3G (3rd Generation)®, 4G (4th Generation)®, LTE (Long Term Evolution)®, WiFi® and the like.

The unrestricted terminal communication unit 14 is configured to receive, from sending terminals existing around thereof including the restricted terminals (the first restricted terminal 20a to the second restricted terminal 20b in FIG. 1) or the access points (the first access point 30a to the fourth access point 30d in FIG. 1), the beacon signals of the relevant sending terminals in compliance with a communication standard suitable for radio communication such as WiFi, Bluetooth®, Bluetooth Low Energy® and the like, and measure the radio wave intensity of the relevant beacon signals.

The unrestricted terminal storage unit 15 includes a storage device such as a ROM, a RAM and a hard disk (e.g., main storage device and auxiliary storage device), and an I/O circuit or the like.

(Configuration of Restricted Terminal)

A configuration of the restricted terminal is described using the first restricted terminal 20a in FIG. 1 as an example. Another restricted terminal 20b also has the same configuration as the first restricted terminal 20a. The restricted terminals (the first restricted terminal 20a to the second restricted terminal 20b in FIG. 1) correspond to the "sending terminal" according to the invention.

The first restricted terminal 20a includes an information terminal such as a tablet type terminal or a smartphone whose size, shape and weight are designed so as to be portable by a user.

The first restricted terminal 20a comprises a restricted terminal arithmetic processing unit 21, a restricted terminal input unit 22, a restricted terminal output unit 23, a restricted terminal communication unit 24, and a restricted terminal storage unit 25.

The restricted terminal input unit 22 corresponds to an "originating terminal input unit" in the information sharing support system according to the invention. The restricted terminal output unit 23 corresponds to a "destination terminal output unit" in the information sharing support system according to the invention. The restricted terminal communication unit 24 corresponds to "originating terminal communication unit" and "destination terminal communication unit" in the information sharing support system according to the invention.

The restricted terminal arithmetic processing unit 21 includes an arithmetic processing device such as a CPU.

The first restricted terminal 20a has a restricted OS (Operating System) installed therein. The relevant restricted OS is read and executed by the restricted terminal arithmetic processing unit 21 such that the restricted terminal arithmetic processing unit 21 executing other programs (application software) is provided with an interface for utilizing each hardware resource in the first restricted terminal 20a (restricted terminal arithmetic processing unit 21, restricted terminal input unit 22, restricted terminal output unit 23, restricted terminal communication unit 24, and restricted terminal storage unit 25).

The restricted terminal arithmetic processing unit 21 executing the restricted OS is configured, differently from the unrestricted terminal arithmetic processing unit 11 executing the unrestricted OS, to make the restricted terminal arithmetic processing unit 21 executing other programs not to recognize the identifiers of the surrounding access points contained in the beacon signals received from the access points.

The restricted terminal arithmetic processing unit 21 reads and executes an information sharing support client program installed therein in advance to function as terminal identifier sending control unit 211 and restricted terminal data transmission and reception control unit 212 described later which perform the arithmetic process.

The restricted terminal input unit 22, restricted terminal output unit 23, restricted terminal communication unit 24, and restricted terminal storage unit 25 have the same configurations as the unrestricted terminal input unit 12, unrestricted terminal output unit 13, unrestricted terminal communication unit 14, and unrestricted terminal storage unit 15, respectively.

(Configuration of Access Point)

The access points existing around the unrestricted terminal and restricted terminal (the first access point 30a to the fourth access point 30d in FIG. 1) are configured to always output the beacon signals including an SSID (Service Set Identifier) and a BSSID as the identifier of the access point in compliance with a radio communication standard such as WiFi.

The identifier of the access point may be an identifier different from the BSSID so long as it is information capable of identifying the access point.

The BSSID is a MAC (Media Access Control) address of the relevant access point (identifier of a first format) which is generated by a generating method for a UUID (Universally Unique Identifier) version 1, for example.

The access points (the first access point 30a to the fourth access point 30d in FIG. 1) correspond to the "sending terminal" according to the invention, and the BSSID of the access point corresponds to a "first sending terminal identifier" according to the invention.

The access point functions to connect wireless LAN (Local Area Network) clients in the vicinity such as the unrestricted terminal and the restricted terminal with each other, or to connect the relevant wireless LAN client to another network, in compliance with a radio communication standard such as WiFi.

(Configuration of Information Sharing Support Server)

The information sharing support server 40 comprises a server arithmetic processing unit 41, a server communication unit 44, and server storage 45.

The server arithmetic processing unit 41 includes an arithmetic processing device such as a CPU. The server arithmetic processing unit 41 executes an information sharing support server program installed therein in advance to function as terminal identifier storing control unit 411 and server data transmission and reception control unit 412 which perform the arithmetic process described later.

The server communication unit 44 is configured to mutually communicate with an external terminal including the unrestricted terminal and the restricted terminal via the wide area network connected with the information sharing support server 40 in compliance with a communication standard suitable for wired communication.

The server storage 45 includes a storage device such as a ROM, a RAM and a hard disk (e.g., main storage device and auxiliary storage device), and an I/O circuit or the like.

(Identifier Storing Control Process)

With reference to FIG. 2A, a description is given in detail of the identifier storing control process, using as an example a process performed by the terminal identifier transmission and reception control unit 111 in the first unrestricted terminal 10a, the terminal identifier sending control unit 211 in the first restricted terminal 20a, and the terminal identifier storing control unit 411.

The terminal identifier transmission and reception control unit 111 performs a process of STEP 110 and STEP 120 in FIG. 2A at a predetermined first interval (e.g., one minute interval). The terminal identifier sending control unit 211 performs a process of STEP 210 in FIG. 2A at a second interval shorter than the first interval (e.g., one second interval). The server data transmission and reception control unit 412 performs a process of STEP 410 to STEP 430 in FIG. 2A at a third interval shorter than the first interval (e.g., one second interval).

At STEP 210 in FIG. 2A, the terminal identifier sending control unit 211 sends the beacon signals via the restricted terminal communication unit 24 in compliance with a communication standard such as Bluetooth, the beacon signals including the identifier of the restricted terminal and being created by use of an information sharing support program. As the identifier of the restricted terminal, an identifier (identifier of a second format) may be used which is generated by means of a UUID version 3 or 5 and includes in part information indicating that the relevant identifier is an identifier used for the relevant information sharing support program and includes in other part information indicating the terminal identifier sending control unit 211, for example.

Note that the identifier of the restricted terminal may be an identifier different from the relevant identifier so long as it is information capable of identifying the restricted terminal.

The identifier of the restricted terminal created by use of the information sharing support program corresponds to a "second sending terminal identifier" according to the invention.

At STEP 110 in FIG. 2A, the terminal identifier transmission and reception control unit 111 changes over a plurality of communication standards such as WiFi and Bluetooth to scan the surrounding beacon signals via the unrestricted terminal communication unit 14 so as to recognize a list of the beacon signals, a reception time point and the radio wave intensity of the relevant beacon signals (in unit of decibel (dBm)).

For example, the terminal identifier transmission and reception control unit 111 recognizes a list as shown in Table 1 below. Here, the identifiers are replaced to signs representing the terminals (access point, restricted terminal) to be expressed for the purpose of ease of description.

The list below is a list of the identifier and reception time point contained in the beacon signals and the radio wave intensity of the beacon signals in a case where the terminal identifier transmission and reception control unit 111 in the first unrestricted terminal 10a receives, at YY/MM/DD 10:00:00, beacon signals of the radio wave intensity −70 from the first access point 30a, beacon signals of the radio wave intensity −50 from the second access point 30b, and beacon signals of the radio wave intensity −60 from the first restricted terminal 20a.

TABLE 1

| Identifier | Reception time point | Radio wave intensity (dBm) |
|---|---|---|
| 30a | YY/MM/DD 10:00:00 | −70 |
| 30b | YY/MM/DD 10:00:00 | −50 |
| 20a | YY/MM/DD 10:00:00 | −60 |

At STEP 120 in FIG. 2A, the terminal identifier transmission and reception control unit 111 transmits this list and the unrestricted terminal identifier that is the identifier of the unit 111 to the information sharing support server 40 via the unrestricted terminal communication unit 14. The unrestricted terminal identifier is an identifier such as a user ID Issued by the information sharing support server 40 to the unrestricted terminal, for example. In place of this, the identifier such as the MAC address of the unrestricted terminal may be used as the unrestricted terminal identifier.

At STEP 410 in FIG. 2A, the terminal identifier storing control unit 411 determines whether or not it receives the beacon signal, the reception time point, and the radio wave intensity of the relevant beacon signals via the server communication unit 44. STEP 410 in FIG. 2A corresponds to an "identifier receiving step" in the information sharing support method according to the invention If the above determination result is negative (NO at STEP 410 in FIG. 2A), the terminal identifier storing control unit 411 ends the current identifier storing control process and starts the next identifier storing control process.

If the above determination result is positive (YES at STEP 410 in FIG. 2A), the terminal identifier storing control unit 411, at STEP 420 in FIG. 2A, determines whether or not the identifier contained in the beacon signals includes information indicating that it is the identifier used for the relevant information sharing support program to determine whether it is the identifier of the first format or the identifier of the second format.

At STEP 430 in FIG. 2A, the terminal identifier storing control unit 411 associates, on the basis of the determined format, the received unrestricted terminal identifier with the identifier, reception time point, and radio wave intensity of the relevant beacon signals contained in the various beacon signals included in the received list to store them in the server storage 45.

STEP 420 to STEP 430 in FIG. 2A correspond to an "identifier storing controlling step" in the information sharing support method according to the invention.

For example, as shown in FIG. 3A, the terminal identifier storing control unit 411 adds the information of the received list formed into a record to a table 50 to store it in the server storage 45, the table 50 including an identifier field 51 representing the identifier of each terminal, an access point field 52 regarding the identifier determined to be an identifier of the first format (BSSID of the access point), and a restricted terminal field 53 regarding the identifier determined to be an identifier of the second format (UUID of the restricted terminal).

Here, the access point field 52 includes an access point identifier field 521 having the identifier of the access point as a value, an access point reception time point field 522 having a time point when the identifier of the access point is received as a value, and an access point radio wave intensity field 523 having the radio wave intensity on receiving the beacon signals as a value.

The restricted terminal field 53 includes a restricted terminal identifier field 531 having the identifier of the restricted terminal as a value, a restricted terminal reception time point field 532 having a time point when the identifier of the restricted terminal is received as a value, a restricted terminal radio wave intensity field 533 having the radio wave intensity on receiving the beacon signals as a value.

The table 50 also includes an unrestricted terminal record 54 associated with the identifier of the unrestricted terminal and a restricted terminal record 55 associated with the Identifier of the restricted terminal.

(Unrestricted Terminal Data Transmission and Reception Control Process)

Figure 2B:
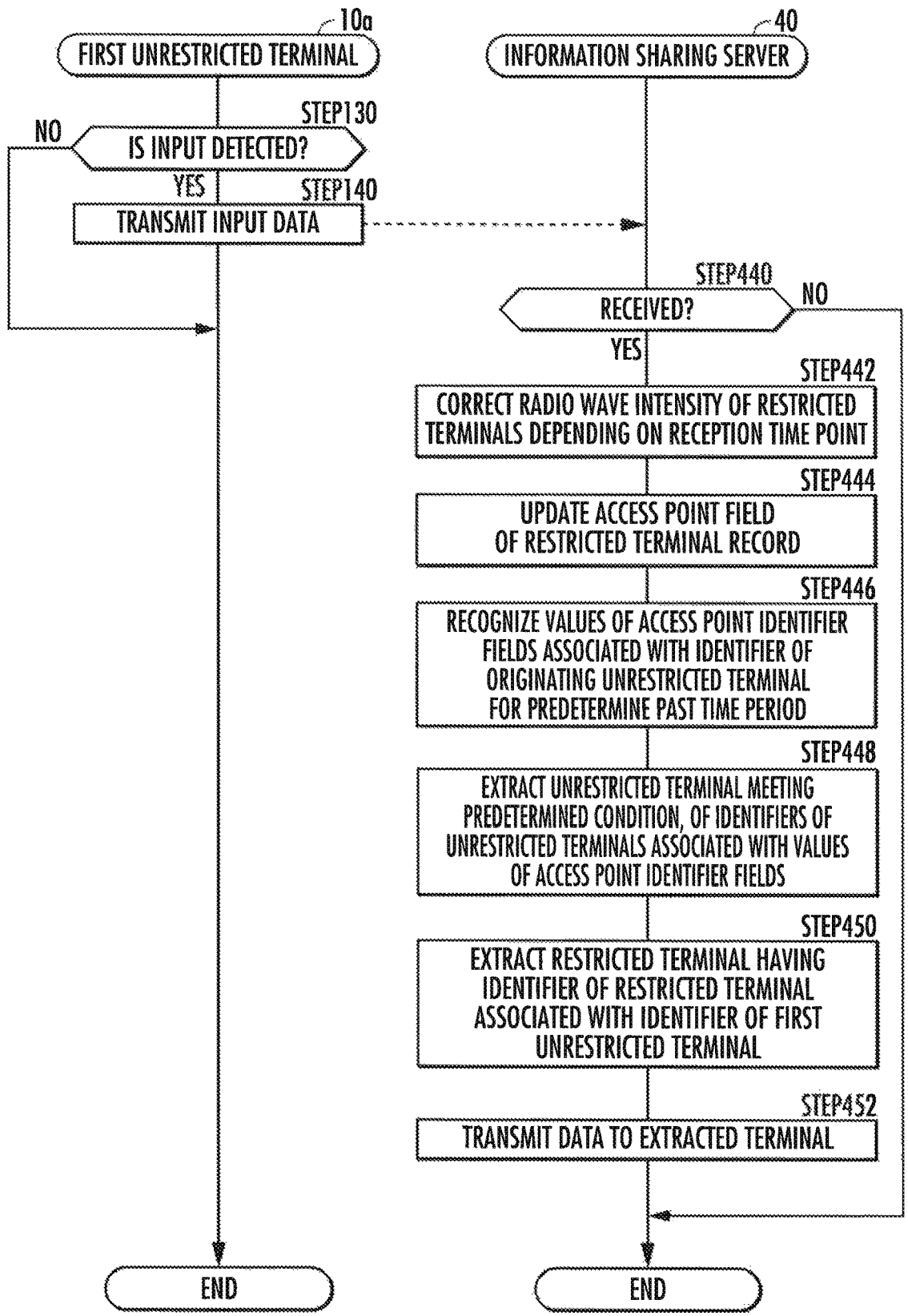

With reference to FIG. 2B, a description is given in detail of the unrestricted terminal data transmission and reception control process, using as an example a process performed by the unrestricted terminal data transmission and reception control unit 112 in the first unrestricted terminal 10a and the server data transmission and reception control unit 412.

Note that the first unrestricted terminal 10a in this description corresponds to the "originating terminal" in the information sharing support server, information sharing support system, and information sharing support method according to the invention.

The unrestricted terminal data transmission and reception control unit 112 performs a process of STEP 130 and STEP 140 in FIG. 2B at a predetermined fourth interval (e.g., one second interval). The server data transmission and reception control unit 412 performs a process of STEP 440 to STEP 452 in FIG. 2B at a predetermined fifth interval (e.g., one second interval).

At STEP 130 in FIG. 2B, the unrestricted terminal data transmission and reception control unit 112 determines whether or not an operation with respect to the unrestricted terminal input unit 12 is detected.

If the above determination result is negative (NO at STEP 130 in FIG. 2B), the unrestricted terminal data transmission and reception control unit 112 ends the current unrestricted terminal data transmission and reception control process and starts the next unrestricted terminal data transmission and reception control process.

If the above determination result is positive (YES at STEP 130 in FIG. 2B), the unrestricted terminal data transmission and reception control unit 112, at STEP 140 in FIG. 2B, transmits data which is input or specified by a user operation via the unrestricted terminal communication unit 14 to the information sharing support server 40. Here, the data may include text data, image data, audio data, moving image data, or other data.

At STEP 440 in FIG. 2B, the server data transmission and reception control unit 412 determines whether or not the data is received from the unrestricted terminal communication unit 14 via the server communication unit 44. STEP 440 in FIG. 2B corresponds to a "data receiving step" in the information sharing support method according to the Invention.

If the above determination result is negative (NO at STEP 440 in FIG. 2B), the server data transmission and reception control unit 412 ends the current unrestricted terminal data transmission and reception control process and starts the next unrestricted terminal data transmission and reception control process.

If the above determination result is positive (YES at STEP 440 in FIG. 2B), the server data transmission and reception control unit 412, at STEP 442 in FIG. 2B, corrects the restricted terminal radio wave intensity field 533 in the table 50 shown in FIG. 3A stored in the server storage 45 depending on a difference between a current time point and the reception time point.

More specifically, the server data transmission and reception control unit 412 multiplies the difference between the current time point and the reception time point (e.g., in units of the first interval (minute) (seconds less than 30 seconds are rounded down to the nearest minute and seconds not less than 30 seconds are rounded up to the nearest minute)) by a predetermined minus value (e.g., −5), and adds the resultant value to a value of the restricted terminal radio wave intensity field 533.

For example, the server data transmission and reception control unit 412, in the case where the current time point is YY/MM/DD 10:02:00, adds, to a value of −60 (dBm) described in the restricted terminal radio wave intensity field 533 which is associated with the terminal identifier of the restricted terminal 20a having the reception time point YY/MM/DD 10:00:00 associated with the terminal identifier of the unrestricted terminal 10a, a value (−10) obtained by multiplying a difference of 2 (minutes) between the current time point and the reception time point by a predetermined value −5, to get −70.

This process updates a value of the restricted terminal radio wave intensity field 533 in the unrestricted terminal record 54 to the corrected value as shown in FIG. 3B.

At STEP 444 in FIG. 2B, the server data transmission and reception control unit 412, with respect to the table 50 shown in FIG. 3B stored in the server storage 45, recognizes a record having the largest radio wave intensity among the radio wave intensities associated with the identifiers of the restricted terminals, recognizes a value of the restricted terminal reception time point field 532 and a value of the identifier field 51 which are included in the relevant record, and recognizes a value of the access point field 52 having the identical reception time point associated with the value of the relevant identifier field 51 as the access point field associated with the identifier of the relevant restricted terminal.

For example, the server data transmission and reception control unit 412 recognizes the record 541 of the largest radio wave intensity −60 with respect to the identifier of the restricted terminal 20a. Then, the server data transmission and reception control unit 412 recognizes a value "YY/MM/DD 10:02:00" of the restricted terminal reception time point field 532 and a value "10c" of the identifier field 51 which are included in the record 541. The server data transmission and reception control unit 412 recognizes values of the access point fields 52 (values in a portion surrounded by a rectangle 542) having the reception time point "YY/MM/DD 10:02:00" associated with the value "10c" of the relevant identifier field 51.

The values of the relevant recognized access point fields 52 (values in a portion surrounded by the rectangle 542) are reflected as values of the access point fields 52 (values in a portion surrounded by a rectangle 552) of a record 551 for the relevant restricted terminal 20a.

The server data transmission and reception control unit 412 may perform the process of STEP 442 to STEP 444 in FIG. 2B periodically at a predetermined interval regardless of whether or not the data is received.

At STEP 446 in FIG. 2B, the server data transmission and reception control unit 412 refers to the table 50 in the server storage 45 (FIG. 3B) to recognize the values of the access point identifier fields 521 associated with the identifier of the originating unrestricted terminal (first unrestricted terminal 10a) (values in a portion surrounded by a rectangle 543) for a time period of a predetermined time past prior to the current time point (e.g., a time period of three minutes prior to the current time point) (corresponding to a "first specific time period" according to the invention).

The above time period may not be necessarily a time period of a predetermined time past prior to the current time point, and may be a time period from a time point one hour prior to a time point two hours before, for example.

More specifically, the server data transmission and reception control unit 412 recognizes 30a, 30b, 30a, and 30b as the values of the access point identifier fields 521 associated with the identifier of the originating unrestricted terminal (first unrestricted terminal 10a).

In place of this, the server data transmission and reception control unit 412 may recognize, among the values of the access point identifier fields 521 associated with the identifier of the originating unrestricted terminal (first unrestricted terminal 10a) (values in a portion surrounded by the rectangle 543), the identifier of the access point having a value of the access point radio wave intensity field 523 equal to or more than a predetermined value.

STEP 446 in FIG. 2B corresponds to a "sending terminal identifier recognizing step" in the information sharing support method according to the invention.

At STEP 448 in FIG. 2B, the server data transmission and reception control unit 412 extracts the identifier of the unrestricted terminal meeting a predetermined condition, among the identifiers of the unrestricted terminals which are associated with the values of the access point identifier fields 521 associated with the identifier of the originating unrestricted terminal (first unrestricted terminal 10a) (values in a portion surrounded by the rectangle 543).

As a predetermined condition, a first condition may be used that, as for a group consisting of the values "30a", "30b", "30a", and "30b" of the access point identifier fields 521 recognized in STEP 446, the number of the values of the access point identifier fields associated with the identifier of the terminal (corresponding to a "first number of identifiers" in the information sharing support server according to the invention) common to the above group is larger than a threshold TH1 (having a value larger than 1, e.g., 2, and corresponding to a "first threshold" in the information sharing support server according to the invention).

Figure 4A:
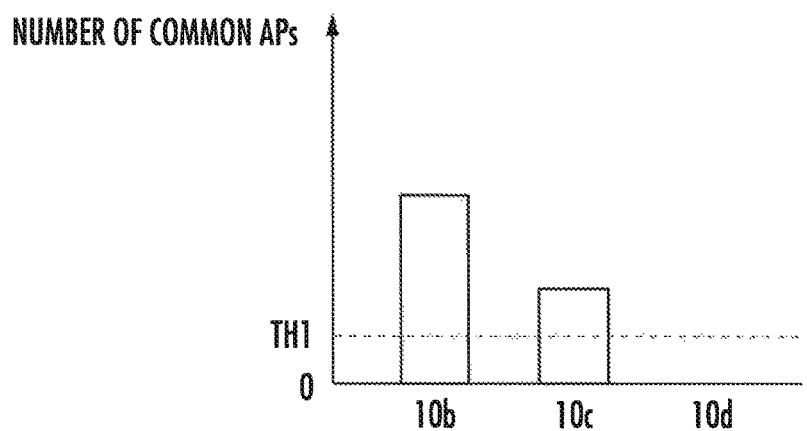

FIG. 4A is graph showing, as for the group consisting of the values "30a", "30b", "30a", and "30b" of the access point identifier fields 521 recognized at STEP 446, the number of the identifiers which are common to the relevant group among the values of the access point identifier fields 521 associated with the identifiers "10b", "10c", and "10d" of the terminals.

For example, since the values of the access point identifier fields 521 for "10b" include "30a", "30b", "30a", and "30b", the number of the identifiers which are common to the relevant group is four.

Further, since the values of the access point identifier fields 521 for "10c" include "30a" and "30b", the number of the identifiers which are common to the relevant group is two.

The values of the access point identifier fields 521 for "10d" do not include "30a" nor "30b", and thus, the number of the identifiers which are common to the relevant group is zero.

In this way, the server data transmission and reception control unit 412 extracts the identifiers "10b" and "10c" of the terminals meeting the first condition, among the identifiers of the terminals which are associated with the values of the access point identifier fields 521 associated with the identifier of the originating unrestricted terminal (first unrestricted terminal 10a) (values in a portion surrounded by the rectangle 543).

At STEP 450 in FIG. 2B, the server data transmission and reception control unit 412 extracts the identifier of the restricted terminal which is associated with the value of the access point identifier field 521 associated with the identifier of the originating unrestricted terminal (first unrestricted terminal 10a) (values in a portion surrounded by the rectangle 543).

For example, the server data transmission and reception control unit 412 extracts the identifier of the restricted terminal "20a" which includes "30a" and "30b" in the access point identifier fields 521.

STEP 448 to STEP 450 in FIG. 2B corresponds to a "destination terminal identifier recognizing step" in the information sharing support method according to the invention.

In place of this, the server data transmission and reception control unit 412 may recognize, among the identifiers of the restricted terminals which are associated with the values of the access point identifier fields 521 associated with the identifier of the originating unrestricted terminal (first unrestricted terminal 10a) (values in a portion surrounded by the rectangle 543), the identifier of the restricted terminal having a value of the access point radio wave intensity field 523 equal to or more than a predetermined value.

At STEP 452 in FIG. 2B, the server data transmission and reception control unit 412 transmits the data received at STEP 440 in FIG. 2 to the terminals identified by the extracted identifiers "10b", "10c", and "20a" (second unrestricted terminal 10b, third unrestricted terminal 10c, first restricted terminal 20a).

STEP 452 in FIG. 2B corresponds to a "data transmitting step" in the information sharing support method according to the invention.

Although not shown in the figure, in the unrestricted terminal, an unrestricted terminal data transmission and reception unit receives the relevant data via an unrestricted terminal data communication unit, and outputs the relevant data to the unrestricted terminal output unit. Moreover, in the restricted terminal, a restricted terminal data transmission and reception unit receives the relevant data via a restricted terminal data communication unit, and outputs the relevant data to the restricted terminal output unit. This may allow the relevant data to be shared between the terminals.

(Restricted Terminal Data Transmission and Reception Control Process)

With reference to FIG. 2C, a description is given in detail of the restricted terminal data transmission and reception control process, using as an example a process performed by the restricted terminal data transmission and reception control unit 212 in the first restricted terminal 20a and the server data transmission and reception control unit 412.

Note that the first restricted terminal 20a in this description corresponds to the "originating terminal" in the information sharing support server, information sharing support system, and information sharing support method according to the invention.

The restricted terminal data transmission and reception control unit 212 performs a process of STEP 220 and STEP 230 in FIG. 2C at a predetermined sixth interval (e.g., one second interval). The server data transmission and reception control unit 412 performs a process of STEP 460 to STEP 470 in FIG. 2C at a predetermined seventh interval (e.g., one second interval).

At STEP 220 in FIG. 2C, the restricted terminal data transmission and reception control unit 212 determines whether or not an operation with respect to the restricted terminal input unit 22 is detected.

If the above determination result is negative (NO at STEP 220 in FIG. 2C), the restricted terminal data transmission and reception control unit 212 ends the current restricted terminal data transmission and reception control process and starts the next restricted terminal data transmission and reception control process.

If the above determination result is positive (YES at STEP 220 in FIG. 2C), the restricted terminal data transmission and reception control unit 212, at STEP 230 in FIG. 2C, transmits data which is input or specified by a user operation via the restricted terminal communication unit 24 to the information sharing support server 40.

At STEP 460 in FIG. 2C, the server data transmission and reception control unit 412 determines whether or not the data is received from the restricted terminal communication unit 24 via the server communication unit 44.

STEP 460 in FIG. 2C corresponds to a "data receiving step" in the information sharing support method according to the invention.

If the above determination result is negative (NO at STEP 460 in FIG. 2C), the server data transmission and reception control unit 412 ends the current restricted terminal data transmission and reception control process and starts the next restricted terminal data transmission and reception control process.

If the above determination result is positive (YES at STEP 460 in FIG. 2C), the server data transmission and reception control unit 412, at STEP 462 in FIG. 2C, corrects the restricted terminal radio wave intensity field 533 in the table 50 shown in FIG. 3A stored in the server storage 45 depending on a difference between the current time point and the reception time point. This process is the same as that at STEP 442 in FIG. 2B.

At STEP 464 in FIG. 2C, the server data transmission and reception control unit 412, with respect to the table 50 shown in FIG. 3B stored in the server storage 45, recognizes a record having the largest radio wave intensity among the radio wave intensities associated with the identifiers of each of the restricted terminals, recognizes a value of the restricted terminal reception time point field 532 and a value of the identifier field 51 which are included in the relevant record, and recognizes a value of the access point field 52 having the identical reception time point associated with the value of the relevant identifier field 51 as the access point field associated with the identifier of the relevant restricted terminal. This process is the same as that at STEP 444 in FIG. 2B.

The server data transmission and reception control unit 412 may perform the process of STEP 462 to STEP 464 in FIG. 2C periodically at a predetermined interval regardless of whether or not the data is received.

At STEP 466 in FIG. 2C, the server data transmission and reception control unit 412 refers to the table 50 in the server storage 45 (FIG. 3B) to recognize the values "30a" and "30b" of the access point identifier fields 521 associated with the identifier of the originating restricted terminal (first restricted terminal 20a) (values in a portion surrounded by a rectangle 553).

In place of this, the server data transmission and reception control unit 412 may recognize, among the access points "30a" and "30b" associated with the identifier of the originating restricted terminal (first restricted terminal 20a), each value "30b" of the access point identifier fields 521 with a value of the access point radio wave intensity field 523 being equal to or more than a predetermined value (e.g., −60).

STEP 466 in FIG. 2C corresponds to a "sending terminal identifier recognizing step" in the information sharing support method according to the invention.

At STEP 468 in FIG. 2C, the server data transmission and reception control unit 412 refers to the table 50 in the server storage 45 (FIG. 3B) to recognize the values "10a", "10b", and "10c" of the identifier fields 51 associated with the values "30a" and "30b" of the access point identifier fields 521 (values in a portion surrounded by the rectangle 553) which are recognized at STEP 466 in FIG. 2C.

In place of this, the server data transmission and reception control unit 412 may recognize, among the terminal identifiers associated with the values "30a" and "30b" of the access point identifier fields 521 (values In a portion surrounded by the rectangle 553), the values "10a", "10b", and "10c" of the identifier fields 51 with a value of the access point radio wave intensity field 523 being equal to or more than a predetermined value (e.g., −60).

STEP 468 in FIG. 2C corresponds to a "destination terminal identifier recognizing step" in the information sharing support method according to the invention.

At STEP 470 in FIG. 2C, the data received at STEP 460 in FIG. 2C is transmitted to the terminals identified by the values "10a", "10b", and "10c" (first unrestricted terminal 10a to third unrestricted terminal 10c) of the relevant recognized identifier fields 51.

STEP 468 in FIG. 2C corresponds to a "data transmitting step" in the information sharing support method according to the invention.

The terminal receiving this data outputs the relevant data from an output device of the terminal (e.g., the text data may be displayed on a screen of the display device such as a display, or the audio data may be reproduced by the audio output device such as a speaker) such that the relevant data may be shared.

(Effect According to Embodiment)

According to the information sharing support system of the relevant configuration, if the data is transmitted from one terminal, the relevant data is transmitted to another terminal identified by the identifier which is associated with the identifier of the access point which is associated with the identifier of the one terminal (STEP 446 to STEP 452 in FIG. 2B, STEP 466 to STEP 470 in FIG. 2C).

This supports the data sharing between the terminals which are estimated to exist in a short distance such that an identifier of a certain access point can or could be received from the relevant access point currently or in the past.

The data is transmitted to the terminal in the case the first condition is satisfied that, among the access point identifier fields 521 associated with the originating terminal, as for a group consisting of the values "30a", "30b", "30a", and "30b" of the access point identifier fields 521 in which the reception time point is a predetermined time period in the past from the current time point, the number of the values of the access point identifier fields associated with the identifier of the terminal which are common to the above group is equal to or more than the first threshold TH1 (e.g., two) (STEP 446 in FIG. 2B to STEP 452 in FIG. 2B).

This causes the data to be likely to be transmitted to the terminals 10b to 10c of users U10b to U10c who moved on the route similar to a user U10a of the originating terminal 10a within a predetermined past time period as is shown by arrows V10a to V10c in FIG. 1, and causes the data to be unlikely to be transmitted to a user U10d on a different moving route. This may allow the information to be shared between the terminals 10a to 10c of the users U10a to U10c who moves on the similar route.

Also for a terminal incapable of recognizing the BSSID of the access point existing therearound, the identifier of the access point associated with the relevant terminal is determined (STEP 442 to STEP 444 in FIG. 2B, STEP 462 to STEP 464 in FIG. 2C).

The data is transmitted on the basis of the relevant associated identifier of the access point (STEP 446. STEP 450 to STEP 452 in FIG. 2B, STEP 466 to STEP 470 in FIG. 2C) such that, even if there is a terminal incapable of recognizing the BSSID of the access point existing therearound which the data is originated from or transmitted to, the data sharing is supported between the terminals which are estimated to exist in a short distance short such that an identifier of a certain access point can or could be received from the relevant access point currently or in the past.

(Modified Aspect)

In addition or alternatively to the first condition at STEP 448 in FIG. 2 according to the embodiment, a second condition may be used that the terminal meets that the number of times the terminal receives the identifier of one access point for a predetermined time period prior to the current time (the number of records regarding the identifier of the relevant one access point associated with the identifier of the terminal which has the reception time point within a predetermined time period prior to the current time) (corresponding to a "first number of identifiers" in the information sharing support server according to the invention) is a predetermined number or more (corresponding to a "first threshold" in the information sharing support server according to the invention).

In addition or alternatively to the first to second conditions, a third condition may be used that the terminal meets that the number of times the terminal receives the identifier of the relevant one access point (corresponding to the "first number of identifiers" in the information sharing support server according to the invention) is equal to or more than a value (corresponding to the "first threshold" in the information sharing support server according to the invention) obtained by multiplying the number of times the originating terminal receives the identifier of the relevant one access point (corresponding to a "second number of identifiers" in the information sharing support server according to the invention) by a predetermined rate.

In addition or alternatively to the first to third conditions, a fourth condition may be used that the terminal meets that the number of the identifiers received by the terminal (the number of records regarding the identifier of the access point associated with the identifier of the terminal which has the reception time point within a predetermined time period prior to the current time) (corresponding to the "first number of identifiers" in the information sharing support server according to the invention) is equal to or more than a value (corresponding to the "first threshold" in the information sharing support server according to the invention) obtained by multiplying the number of the identifiers received by the originating terminal (the number of records regarding the identifier of the access point associated with the identifier of the originating terminal which has the reception time point within a predetermined time period prior to the current time) (corresponding to the "second number of identifiers" in the information sharing support server according to the invention) by a predetermined rate.

In addition or alternatively to the first to fourth conditions, a fifth condition may be used that a target terminal meets that in a case where a period from the current time point to a predetermined time prior to the current time point (first specific time period) is divided into a plurality of second specific time periods, for each of the second specific time points, whether or not a third number of identifiers is equal to or more than a second threshold is recognized, the third number of identifiers being the number of the identifiers of the access points associated with both of the identifier of the originating terminal and the identifier of the target terminal for the relevant second specific time period or being the number of times the access point is received by both of the originating terminal and the target terminal for the relevant second specific time period, and a ratio of the second specific time periods, in which the third number of identifiers is equal to or more than the second threshold, to the entire first specific time period is equal to or more than a predetermined ratio.

Figure 4B:
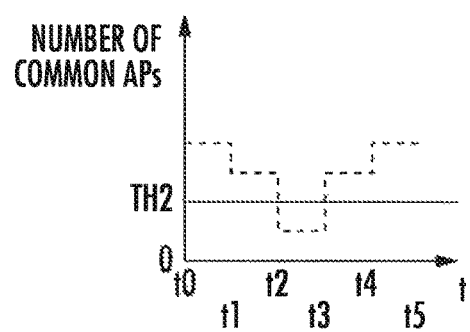

More specifically, as shown in FIG. 4B (or FIG. 4C), the first specific time period t0 to t5 (t10 to t15) is divided into a plurality of second specific time periods t0 to t1, t1 to t2, t2 to t3, t3 to t4, t4 to t5 (t10 to t11, t11 to t12, t12 to t13, t13 to t14, t14 to t15).

Here, it is recognized is for each second specific time period, whether or not the number of the identifiers of the access points associated with both of the identifier of the originating terminal and the identifier of the target terminal for the relevant second specific time period (the number of common AP, corresponding to the "third number of identifiers" according to the invention) is equal to or more than a second threshold TH2 (e.g., two).

The second threshold may be a predetermined value larger than 1, or a value obtained by multiplying the number of the identifiers of the access points associated with the identifier of the originating terminal for the relevant second specific time period by a predetermined rate.

The fifth condition is a condition that the target terminal meets that the ratio of the second specific time periods in which the number of the identifiers of the access points associated with both of the identifier of the originating terminal and the identifier of the target terminal for the relevant second specific time periods is equal to or more than the second threshold TH2 to the entire first specific time period Is equal to or more than a predetermined ratio (e.g., 50%).

In the graph shown in FIG. 4B, the ratio of the second specific time periods t0 to t1, t1 to t2, t3 to t4, t4 to t5 In which the number of the identifiers of the access points associated with both of the identifier of the originating terminal and the identifier of the target terminal in the second specific time periods is equal to or more than the second threshold TH2 is 80% of the entire first specific time period t0 to t5, that is, equal to or more than the predetermined ratio (e.g., 50%). Therefore, the target terminal in FIG. 4C is determined to meet the fifth condition.

Figure 4C:
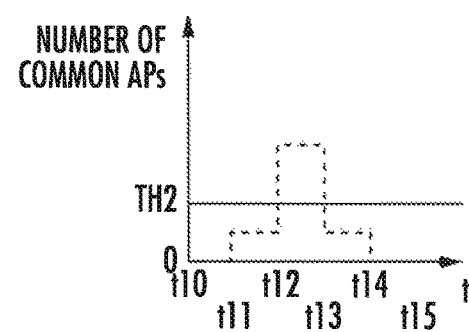

On the other hand, in the graph shown in FIG. 4C, the ratio of the second specific time period t12 to t13 in which the number of the identifiers of the access points associated with both of the identifier of the originating terminal and the identifier of the target terminal in the relevant second specific time period is equal to or more than the second threshold TH2 is 20% of the entire first specific time period t10 to t15, that is, less than the predetermined ratio (e.g., 50%). Therefore, the target terminal in FIG. 4C is determined to not meet the fifth condition.

Here, in addition or alternatively to the number of the identifiers of the access points associated with both of the identifier of the originating terminal and the identifier of the target terminal for the relevant second specific time period, whether or not the number of times the access point is received by both of the originating terminal and the target terminal for the relevant second specific time period is equal to or more than the second threshold may be determined.

Figure 4D:
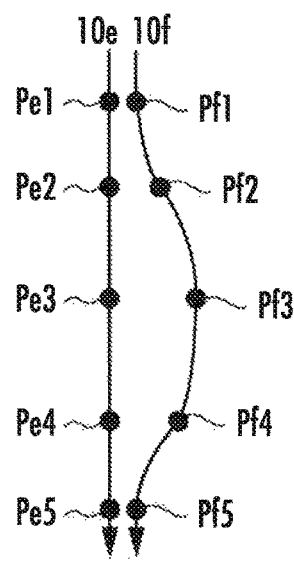

If a terminal 10f meets the fifth condition (in the cased of FIG. 4B), as shown in FIG. 4D, it can be estimated that while an originating terminal 10e moves on a route including positions Pe1 to Pe5 for a predetermined time period t0 to t5, the terminal 10f moves on a route including positions Pf1 to Pf5 respectively near the positions Pe1 to Pe5 for the relevant time period t0 to t5.

Figure 4E:
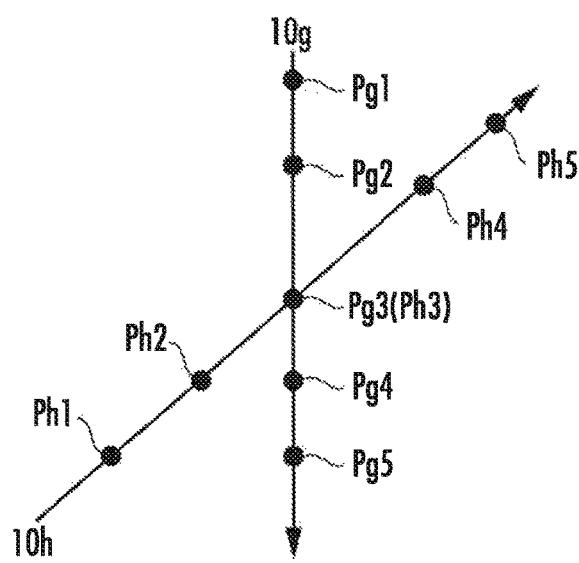

On the other hand, if a terminal 10h does not meet this condition (in the cased of FIG. 4C), as shown in FIG. 4E, it can be estimated that while an originating terminal 10g moves on a route including positions Pg1 to Pg5 for a predetermined first specific time period t10 to t15, the terminal 10h moves on a route including positions Ph1 to Ph5 respectively apart from (or only temporarily near) the positions Pg1 to Pg5 for the relevant first specific time period t10 to t15.

Therefore, the data is transmitted to the terminal meeting this fifth condition such that the data sharing is supported between the terminals which are estimated to be continuously existing within a short distance.

In addition or alternatively to the first condition to the fifth condition, a sixth condition may be used that the terminal meets that as for the access point associated with the identifier of the originating terminal, the value of the access point radio wave intensity field 523 of the target terminal is equal to or more than a predetermined value.

In addition or alternatively to the first condition to the sixth condition, a seventh condition may be used that as for the identifier of the same access point, an absolute value of a difference between the value of the access point radio wave intensity field 523 of the originating terminal and the value of the access point radio wave intensity field 523 of the target terminal is equal to or less than a predetermined value.

The restricted terminal is not limited only to the terminal in which the recognition of the identifier of the access point is restricted by the OS, but may be a terminal incapable of receiving the beacon signal from the access point. For example, in a case where the access point transmits WiFi beacon signals, a terminal not comprising a WiFi communication function may be used as a restricted terminal.

REFERENCE SIGNS LIST 10a to 10d . . . Unrestricted terminal (plural terminals, originating terminal, destination terminal), 111 . . . unrestricted terminal data transmission and reception control unit (originating terminal data transmission control unit, destination terminal data reception control unit), 12 . . . unrestricted terminal input unit (originating terminal input unit), 13 . . . unrestricted terminal output unit (destination terminal output unit), 14 . . . unrestricted terminal communication unit (originating terminal communication unit, destination terminal communication unit), 20a to 20b . . . restricted terminal (sending terminal, destination terminal), 211 . . . restricted terminal data transmission and reception control unit (originating terminal data transmission control unit, destination terminal data reception control unit), 22 . . . restricted terminal input unit (originating terminal input unit), 23 . . . restricted terminal output unit (destination terminal output unit), 24 . . . restricted terminal communication unit (originating terminal communication unit, destination terminal communication unit), 30a to 30d . . . access point (sending terminal), 40 . . . information sharing support server, 44 . . . server communication unit, 45 . . . server storage, 411 . . . identifier storing control unit, 412 . . . server data transmission and reception control unit

The invention claimed is:

1. An information sharing support server comprising:
a server storage configured to store information;
a server communication unit configured to perform communication with a plurality of terminals, which include one or more sending terminals and one or more originating terminals, each terminal of the plurality of terminals having an identifier and configured to wirelessly receive the identifier of a sending terminal and store a sending terminal list containing each of received sending terminal identifiers in association with reception time points thereof;
an identifier storing control unit configured to: repeatedly receive from each terminal of the plurality of terminals an identifier of the terminal and the sending terminal list of the terminal and store in the server storage the identifier of the terminal and the sending terminal list of the terminal in association with each other; and
a server data transmission and reception control unit configured to:
receive from an originating terminal requiring sharing of a data, an identifier of the originating terminal and the data via the server communication unit,
search the server storage to find a first set of sending terminal identifiers associated with the identifier of the originating terminal and having the reception time point within a predetermined first specific time period,
search the server storage to create a second set of identifiers of terminals associated with any identifiers from the first set of sending terminal identifiers having a first number of associations therewith equal to or more than a first threshold and which the reception time point of the sending terminal is within the predetermined first specific time period,
transmit the data to the terminals identified by the second set of identifiers via the server communication unit,
wherein the first specific time period is divided into a plurality of second specific time periods, the server data transmission and reception control unit is further configured to recognize for a particular second specific time period of the plurality of second specific time periods, whether or not a third number of identifiers is equal to or more than a second threshold, the third number of identifiers being a number of the identifiers of the sending terminals associated with both of the identifier of the originating terminal and the identifier of a target terminal for the particular second specific time period or being a number of times the sending terminal identifier is received by both of the originating terminal and the target terminal for the particular second specific time period, recognize the identifier of the target terminal for which a ratio of the second specific time period, for which the third number of identifiers is equal to or more than the second threshold, to the entire first specific time period is equal to or more than a predetermined ratio, and transmits the data to a particular terminal of the plurality of terminal identified by the recognized identifier via the server communication unit.

2. The information sharing support server according to claim 1, wherein
the first threshold is a value obtained by multiplying a second number of identifiers by a predetermined rate, the second number of identifiers being a number of the identifiers in the first set of sending terminal identifiers or a number of times receiving the identifier of the sending terminal within the first specific time period.

3. The information sharing support server according to claim 1, wherein
the first threshold is a predetermined value larger than one.

4. The information sharing support server according to claim 1, wherein
the sending terminal list of the terminal includes a radio wave intensity of signals for each sending terminal, and
the server data transmission and reception control unit is configured to, when receiving the identifier of the originating terminal and the data via the server communication unit, refer to the server storage to recognize the identifier of the sending terminal associated with the identifier of the originating terminal, and recognize the identifier of a particular terminal of which the radio wave intensity meets a predetermined condition, among the identifiers of the terminals associated with the identifier of the sending terminal, and transmit the data to the particular terminal.

5. The information sharing support server according to claim 1, wherein
the identifier of the sending terminal is a first sending terminal identifier that is the identifier of the sending terminal of a predetermined first format or a second sending terminal identifier that is the identifier of the sending terminal of a predetermined second format which is different from the first format, and
the server data transmission and reception control unit is configured to, when receiving from the originating terminal the identifier thereof, refer to the server storage to recognize the first sending terminal identifier associated with the identifier of the originating terminal, recognize the identifier of a particular terminal associated with the identifier of the first sending terminal, recognize the identifier of the second sending terminal associated with the identifier of the particular terminal, and transmit the data to a particular sending terminal identified by the second sending terminal identifier.

6. The information sharing support server according to claim 1, wherein
the identifier of the sending terminal is a first sending terminal identifier having a predetermined first format or a second sending terminal identifier having a predetermined second format which is different from the first format, and
the server data transmission and reception control unit is further configured to, when receiving the second sending terminal identifier and the data, refer to the server storage to recognize the identifier of a particular terminal associated with the second sending terminal identifier, recognize the first sending terminal identifier associated with the particular terminal, recognize the identifier of a receiving terminal associated with the first sending terminal identifier, and transmit the data to the receiving terminal identified.

7. A system comprising:
a plurality of terminals, which include one or more sending terminals and one or more originating terminals, each terminal of the plurality of terminals having an identifier and configured to wirelessly receive the identifier of a sending terminal and store a sending terminal list containing each of received sending terminal identifiers in association with reception time points thereof; and an information sharing support server, wherein the information sharing support server comprising, a server storage configured to store information, a server communication unit configured to perform communication with the plurality of terminals, an identifier storing control unit configured to: repeatedly receive from each terminal of the plurality of terminals an identifier of the terminal and the sending terminal list of the terminal and store in the server storage the identifier of the terminal and the sending terminal list of the terminal in association with each other; and a server data transmission and reception control unit configured to:

receive from an originating terminal requiring sharing of a data, an identifier of the originating terminal and the data via the server communication unit, search the server storage to find a first set of sending terminal identifiers associated with the identifier of the originating terminal and having the reception time point within a predetermined first specific time period, search the server storage to create a second set of identifiers of terminals associated with any of identifiers from the first set of sending terminal identifiers having a first number of associations therewith equal to or more than a first threshold and which the reception time point of the sending terminal is within the predetermined first specific time period, transmit the data to a destination terminal that is identified within the second set of identifiers via the server communication unit, wherein the first specific time period is divided into a plurality of second specific time periods, the server data transmission and reception control unit is further configured to recognize for a particular second specific time period of the plurality of second specific time periods, whether or not a third number of identifiers is equal to or more than a second threshold, the third number of identifiers being a number of the identifiers of the sending terminals associated with both of the identifier of the originating terminal and the identifier of a target terminal for the particular second specific time period or being a number of times the sending terminal identifier is received by both of the originating terminal and the target terminal for the particular second specific time period, recognize the identifier of the target terminal for which a ratio of the second specific time period, for which the third number of identifiers is equal to or more than the second threshold, to the entire first specific time period is equal to or more than a predetermined ratio, and transmits the data to a particular terminal of the plurality of terminal identified by the recognized identifier via the server communication unit, the originating terminal comprising, an originating terminal input unit configured to detect an input operation by a user, an originating terminal communication unit configured to perform communication, and an originating terminal data transmission control unit configured to transmit the data to the information sharing support server via the originating terminal communication unit depending on the input operation by the user to the originating terminal input unit, the destination terminal comprising, a destination terminal output unit configured to output information, a destination terminal communication unit configured to perform communication, and a destination terminal data reception control unit configured to output to the destination terminal output unit, data which is received from the information sharing support server via the destination terminal communication unit.

8. A method carried out by an information sharing support server which includes a server storage configured to store information and a server communication unit configured to perform communication with a plurality of terminals, which include one or more sending terminals and one or more originating terminals, each terminal of the plurality of terminals having an identifier and configured to wirelessly receive the identifier of a sending terminal and store a sending terminal list containing each of received sending terminal identifiers in association with reception time points thereof, the method comprising:

repeatedly receiving from each terminal of the plurality of terminal, an identifier of the terminal and the sending terminal list of the terminal;

storing in the server storage the identifier of the terminal and the sending terminal list of the terminal in association with each other;

receiving from an originating terminal requiring sharing of a data, an identifier of the originating terminal and the data via the server communication unit;

searching the server storage to find a first set of sending terminal identifiers associated with the identifier of the originating terminal and having the reception time point within a predetermined first specific time period;

searching the server storage to create a second set of identifiers of terminals associated with any of identifiers from the first set of sending terminal identifiers having a first number of associations therewith equal to or more than a first threshold and which the reception time point of the sending terminal is within the predetermined first specific time period; and transmitting the data to the terminals identified by the second set of identifiers via the server communication unit;

wherein the first specific time period is divided into a plurality of second specific time periods, recognizing for a particular second specific time period of the plurality of second specific time periods, a third number of identifiers is equal to or more than a second threshold, the third number of identifiers being a number of the identifiers of the sending terminals associated with both of the identifier of the originating terminal and the identifier of a target terminal for the particular second specific time period or being a number of times the sending terminal identifier is received by both of the originating terminal and the target terminal for the particular second specific time period, recognizing the identifier of the target terminal for which a ratio of the second specific time period, for which the third number of identifiers is equal to or more than the second threshold, to the entire first specific time period is equal to or more than a predetermined ratio, and transmitting the data to a particular terminal of the plurality of terminal identified by the recognized identifier.

* * * * *